United States Patent
Robbin et al.

(10) Patent No.: US 7,590,773 B2
(45) Date of Patent: Sep. 15, 2009

(54) HOT UNPLUGGABLE MEDIA STORAGE DEVICE

(75) Inventors: Jeffrey L. Robbin, Los Altos, CA (US); David Heller, San Jose, CA (US); Craig A. Marciniak, Campbell, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 11/543,681

(22) Filed: Oct. 4, 2006

(65) Prior Publication Data

US 2007/0028009 A1 Feb. 1, 2007

Related U.S. Application Data

(63) Continuation of application No. 10/923,549, filed on Aug. 20, 2004, now Pat. No. 7,146,437, which is a continuation of application No. 10/277,388, filed on Oct. 21, 2002, now Pat. No. 6,799,226.

(60) Provisional application No. 60/398,192, filed on Jul. 23, 2002.

(51) Int. Cl.
*G06F 3/00* (2006.01)
*G06F 13/12* (2006.01)

(52) U.S. Cl. .............................. 710/17; 710/16; 710/18; 710/19; 710/36; 710/62; 710/74

(58) Field of Classification Search ...................... 710/8, 710/10, 14–19, 32, 72–74
See application file for complete search history.

(56) References Cited

U.S. PATENT DOCUMENTS 5,323,291 A 6/1994 Boyle et al.

(Continued)

FOREIGN PATENT DOCUMENTS

| EP | 0 917 077 | 5/1999 |
|---|---|---|
| EP | 0 917 077 A2 | 5/1999 |
| EP | 0 982 732 A1 | 3/2000 |

(Continued)

OTHER PUBLICATIONS

Miniman, "Applian Software's Replay Radio and Player v1.02," Product review, pocketnow.com, http://www.pocketnow.com/reviews/replay/replay.htm, Jul. 31, 2001.

(Continued)

*Primary Examiner*—Alan Chen
(74) *Attorney, Agent, or Firm*—Beyer Law Group LLP

(57) ABSTRACT

Improved techniques for rendering a peripheral device removable (e.g., unpluggable) are disclosed. According to one aspect of the invention, the peripheral device is rendered removable from a host computer without preparatory user actions. In effect, the peripheral device can be automatically prepared for removal in the event that its user removes (unplugs) it from its host computer. According to another aspect of the invention, the peripheral device includes a data storage device that is mounted to a file system of the other computer when the other computer desires access to the data storage device. Otherwise, the data storage device is normally unmounted so that if the peripheral device were to be removed (e.g., unplugged) no harm or damage to data stored therein would occur. These aspects of the invention can be utilized alone or in combination with one another. The invention is particularly well suited for peripheral devices that are media players which are "hot" unpluggable without detrimental consequences.

24 Claims, 6 Drawing Sheets

U.S. PATENT DOCUMENTS

| | | | |
|---|---|---|---|
| 5,583,993 | A | 12/1996 | Foster et al. |
| 5,710,922 | A | 1/1998 | Alley et al. |
| 5,721,949 | A | 2/1998 | Smith et al. |
| 5,778,384 | A | 7/1998 | Provino et al. |
| 5,831,613 | A | 11/1998 | Johnston et al. |
| 5,832,213 | A | 11/1998 | Duncan |
| 5,835,721 | A | 11/1998 | Donahue et al. |
| 5,835,732 | A | 11/1998 | Kikinis et al. |
| 5,949,979 | A | 9/1999 | Snow et al. |
| 5,974,473 | A | 10/1999 | Leavitt et al. |
| 6,000,000 | A | 12/1999 | Hawkins et al. |
| 6,052,692 | A | 4/2000 | Anderson et al. |
| 6,073,195 | A | 6/2000 | Okada |
| 6,177,957 | B1 | 1/2001 | Anderson |
| 6,208,044 | B1 | 3/2001 | Viswanadham et al. |
| 6,332,175 | B1 | 12/2001 | Birrell et al. |
| 6,377,530 | B1 | 4/2002 | Burrows |
| 6,483,428 | B1 | 11/2002 | Fish et al. |
| 6,668,271 | B1 | 12/2003 | Wolff |
| 6,671,831 | B1 | 12/2003 | Sartore et al. |
| 6,799,226 | B1 | 9/2004 | Robbin et al. |
| 2002/0175665 | A1 | 11/2002 | O'Grady et al. |
| 2002/0189429 | A1 | 12/2002 | Qian et al. |
| 2005/0021880 | A1 | 1/2005 | Robbin et al. |

FOREIGN PATENT DOCUMENTS

| | | |
|---|---|---|
| EP | 0 982 732 | 6/2000 |
| EP | 1 028 425 | 8/2000 |
| EP | 1 028 425 A2 | 8/2000 |
| WO | 95/16950 | 6/1995 |
| WO | WO 95/16950 | 6/1995 |
| WO | 01/33569 | 5/2001 |
| WO | WO 01/33569 A1 | 5/2001 |

OTHER PUBLICATIONS

Handbook for Palm™ m500 Series Handhelds, User Manual, Palm, Inc., 1998-2001.

Corporate Sync 2.1 for Palm, Macintosh Edition User's Guide, Stel-tor Inc., Mar. 2001.

IBM Technical Disclosure Bulletin, Jun. 1, 1992, pp. 7-9, vol. 35, "File Access Staging Facility for Computer Systems."

"Frequently Asked Questions about Syquest Disks on Silicon Graphics Computer," Bob Miller, last updated Sep. 21, 1994, www.unix.necoac.de/dateien/sgi/syquest-on-sgi-faq, accessed on Feb. 20, 2005.

Universal Serial Bus Specification, Revision 2.0, Apr. 27, 2000.

Handspring Visor Edge, "The incredibly thin, infinitely expandable handheld computer," copyright 2001.

PCSTATs, "Innogear MiniJam MP3 Springboard Module."

SmartComputing, "Play Music on Your PDS."

Personal Jukebox (PJB), "Systems Research Center and PAAD," Compaq Computer Corp., Oct. 13, 2000, http://research.compaq.com/SRC/pjb/.

Steinberg, "Sonicblue Rio Car," Product Review, Dec. 12, 2000, http//electronics.cnet.com/electronics/0-6342420-1304-4098389.html.

Chuck Zimmer and Lawrence Wachter, "IEEE Standard 1394: Firewire," UCF Computer Networks EEL 4781, http://www-ece.engr.ucf.edu/~jza/classes/4781/Firewire/firewire.html, Nov. 24, 1998.

http://johnpauldavis.org/archives/unmount_and_unmount_ipod.html, unmount and mount iPOD, Jan. 8, 2003.

http://www.osxfaq.com/man/8/automount.ws, description of automount, copyright 2000-2004.

http://www.macobserver.com/tips/hotcocoa/2001/20010803.shtml, "Console yourself: Understanding Mac OS X Logs," dated Aug. 3, 2001.

Zimmer, Chuck and Wachter, Lawrence, "IEEE Standard 1394: Firewire", UCF Computer Networks EEL 4781, http://www.ece.engr.ucf.edu/~jza/classes/4781/Firewire/firewire.html, Nov. 24, 1998.

"Unmount and mount iPod", downloaded from http://johnpauldavis.org/archives/unmount_and_mount_ipod.html on Jan. 8, 2003.

Description of Automount, copyright 2000-2004, downloaded from http://www.osxfaq.com/man/8/automount.ws.

"Console Yourself: Understanding Mac OS X Logs", dated Aug. 3, 2001 and downloaded from http://www.macobserver.com/tips/hotcocoa/2001/20010803.shtml.

Miniman, "Applian Software's Replay Radio and Player v1.02", Product review, pocketnow.com, http://www.pocketnow.com/reviews/replay/replay.htm dated Jul. 31, 2001.

Personal Jukebox (PJB), "Systems Research Center and PAAD", Compaq Computer Corp., Oct. 13, 2000, http://research.compaq.com/SRC/pjb/.

Steinberg, "Sonicblue Rio Car", Product review, Dec. 12, 2000, http://electronics.cnet.com/electronics/0-6342420-1304-4098389.html.

Handbook for Palm m500 Series Handhelds, User Manual, Palm, Inc., 1998-2001.

Corporate Sync 2.1 for Palm, Macintosh Edition User's Guide, Stel-tor Inc., Mar. 2001.

Handspring Visor Edge, "The incredibly thin, infinitely expandable handheld computer", copyright 2001.

PCSTATs, "Innogear MiniJam MP3 Springboard Module".

SmartComputing, "Play Music On Your PDA".

Universal Serial Bus Specification, Revision 2.0, Apr. 27, 2000.

IBM Technical Disclosure Bulletin, Jun. 1, 1992, pp. 7-9, vol. 35, "File Access Staging Facility for Computer Systems".

"Frequently Asked Questions about Skquest Disks on Silicon Graphics Computer". Bob Miller, last updated Sep. 21, 1994. www.unix.necoac.de/dateien/sgi/syquest-on-faq, accessed on Feb. 20, 2005.

the contents of a computer system while the computer system is active. This is generally referred to as "hot plug-
HOT UNPLUGGABLE MEDIA STORAGE DEVICE

CROSS REFERENCE TO RELATED APPLICATIONS

This application is a continuation of U.S. patent application Ser. No. 10/923,549, filed Aug. 20, 2004 now U.S. Pat. No. 7,146,437, entitled "HOT UNPLUGGABLE MEDIA STORAGE DEVICE," which is hereby incorporated herein by reference, which is a continuation of U.S. patent application Ser. No. 10/277,388, filed Oct. 21, 2002, entitled "HOT UNPLUGGABLE MEDIA STORAGE DEVICE," now U.S. Pat. No. 6,799,226, which is hereby incorporated herein by reference, and which claims the priority benefit of U.S. Provisional Application No. 60/398,192, filed Jul. 23, 2002, and entitled "HOT UNPLUGGABLE MEDIA STORAGE DEVICE," which is hereby incorporated herein by reference.

This application is related to (i) U.S. patent application Ser. No. 10/118,217, filed Apr. 5, 2002, and entitled "MEDIA PLAYER WITH INSTANT PLAY CAPABILITY," now U.S. Pat. No. 6,934,812, which is hereby incorporated herein by reference, and (ii) U.S. patent application Ser. No. 10/118,069, filed Apr. 5, 2002, and entitled "INTELLIGENT SYNCHRONIZATION OF MEDIA PLAYER WITH HOST COMPUTER," which is hereby incorporated herein by reference. This application is also related to U.S. Pat. Nos. 6,121,967 and 6,311,242, which are hereby incorporated herein by reference.

BACKGROUND OF THE INVENTION

1. Field of the Invention

The present invention relates to computer systems and, more particularly, to peripheral devices for computer systems.

2. Description of the Related Art

Peripheral devices are often used to supplement the resources of computer systems. One type of peripheral device is a removable storage media device (or portable storage media device) that provides data storage for a computer system. More particularly, computer systems often connect to one or more removable storage media drives to provide additional data storage for the computer systems. These storage media drives can, for example, be a floppy drive, a Compact-Disc (CD) drive, a hard drive, a removable card drive or a Digital Video Disc (DVD) drive. Such drives can be inserted into media bays of portable computer systems or can be separately housed peripheral devices.

Physically connecting a peripheral device to a computer system requires the electrical connection of the peripheral device to the computer system. The electrical connection is achieved with at least one connector. The connector supplies various signals, including address, data, power, and various other signals, between the peripheral device and the computer system. A first half of the connector resides on a cable of the peripheral device or on a housing of the peripheral device, and a second half of the connector resides on the housing of the computer system or on a cable of the computer system. An insertion action involves the connection of the first half of the connector on the cable or housing of the peripheral device with the second half of the connector on the cable or housing of the computer system. By coupling the two devices using at least one connector, the computer system is able to use the resources of the peripheral device. A removal action involves disconnection of: (i) the first half of the connector from the cable or housing of the peripheral device, (ii) the second half of the connector from the cable or housing of the computer system, or (iii) the first half of the connector from the second half of the connector.

Recently, techniques have been developed that allow the insertion and removal of peripheral devices from external slots or connectors of a computer system while the computer system is active. This is generally referred to as "hot plugging" or "hot unplugging." These techniques prevent electrical damage to the components but are often unable to configure the software structures needed by the operating system in order to utilize the peripheral device.

The removal of a peripheral device that provides data storage, namely, a storage media device, is particularly problematic because data can be lost or corrupted. Even if the storage media drive is not being accessed when the storage media drive is removed, the storage media drive is available for use by the computer system. In such cases, data can be lost or damaged by the removal of the storage media drive.

Hence, prior to removal of a storage media drive, it has been necessary to first inform the operating system of the computer system to prepare the storage media drive for removal. If, instead, a user were to remove the storage media drive without first getting approval from the operating system, then either data on the storage media drive was possibly lost or corrupted or the user was required to reinsert the storage media drive into the computer system so that the operating system can prepare it for removal. For example, once a storage media drive has been made available to a computer system, the storage media drive can be "locked" to encourage against incorrect removal of the storage media drive. In general, the "lock" operates to halt processing and to inform the user that they have removed a "locked" storage media drive which should be reinserted to prevent possible data loss. Hence, if a "locked" storage media drive were to be removed without first being "unlocked," the user would be encouraged with a visual warning to re-attach the storage media drive so that its removal can be safely managed.

Conventionally, insertion of a connector affiliated with a storage media drive would cause a host computer to mount the storage media drive with respect to the file system of the host computer. However, in order to remove the peripheral storage unit, an icon representing the storage media drive could be selected and dragged using the graphical user interface to a trashcan icon, thereby requesting disconnection. Alternatively, an eject command can request disconnection. In either case, the storage media drive would then be unmounted and disconnected.

When a peripheral device is coupled to a host computer and locked thereto, if the device is removed (i.e., disconnected) without requesting disconnection, a warning can be displayed to notify the user of their improper removal of the device and to request its reinsertion. Hence, conventional approaches merely notify the user that the device should not be removed or, if already removed, should be reconnected. Unfortunately, however, users expect devices to be able to be removed at any time they find it to be convenient. Accordingly, the conventional solutions to the removal of such devices are inadequate because they lead to consumer frustration and possibly loss of data. Furthermore, even with the warnings, users may disregard or ignore the warnings or request. Accordingly, there is a need for improved solutions to facilitate removal of peripheral devices (e.g., removable storage media devices) from its host computer system.

SUMMARY OF THE INVENTION

Broadly speaking, the invention relates to improved techniques for rendering a peripheral device removable (e.g., unpluggable). According to one aspect of the invention, the peripheral device is rendered removable from a host computer without preparatory user actions. In effect, the peripheral device can be automatically prepared for removal in the event that its user removes (unplugs) it from its host computer. According to another aspect of the invention, the peripheral device includes a data storage device that is mounted to a file system of the host computer when the host computer desires access to the data storage device. Otherwise, the data storage device is normally unmounted so that if the peripheral device were to be removed (e.g., unplugged) no harm or damage to data stored therein would occur. These aspects of the invention can be utilized alone or in combination with one another. The invention is particularly well suited for peripheral devices that are media players which are resulting "hot" unpluggable without detrimental consequences.

The invention can be implemented in numerous ways, including as a method, system, device, and computer readable medium. Several embodiments of the invention are discussed below.

As a computer readable medium including at least computer program code for accessing a portable electronic device by a host computer over a data link, the portable electronic device having at least storage capability for storing media data, one embodiment of the invention includes at least: computer program code for receiving, at the host computer, an indication that the portable electronic device has been attached to the host computer via the data link; computer program code for logically connecting the portable electronic device to a file system of the host computer once the indication that the portable electronic device has been attached to the host computer has been received; computer program code for performing first processing at the host computer which accesses the portable electronic device provided the portable electronic device is attached to the host computer via the data link; and computer program code for logically disconnecting the portable electronic device from the file system without detaching the portable electronic device from the host computer via the data link, the logically disconnection being performed automatically after completing performance of the first processing which accesses the portable electronic device.

As a computer capable of accessing a portable electronic device, the portable electronic device having at least a bus for data transfer and a storage device for storing media content, one embodiment of the invention includes at least: means for detecting presence of the portable electronic device on the bus associated with the computer; means for mounting the storage device of the portable electronic device with a system of the computer; means for accessing the storage device over the bus to perform initial processing; and means for unmounting the storage device of the portable electronic device from the system of the computer once the initial processing is completed.

As a computer capable of accessing a handheld electronic device, the handheld electronic device having at least a bus for data transfer and a data storage device for storing data, one embodiment of the invention includes at least a file system for storage of data, and a processor. The processor is configured to (i) detect presence of the handheld electronic device on the bus associated with the computer, (ii) mount the data storage device of the handheld electronic device with the file system of the computer, (iv) access the data storage device over the bus to perform initial processing; and (v) unmount the data storage device of the handheld electronic device from the file system of the computer once the initial processing is completed.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques for rendering a peripheral device removable (e.g., unpluggable). According to one aspect of the invention, the peripheral device is rendered removable from a host computer without preparatory user actions. In effect, the peripheral device can be automatically prepared for removal in the event that its user removes (unplugs) it from its host computer. According to another aspect of the invention, the peripheral device includes a data storage device that is mounted to a file system of the host computer when the host computer desires access to the data storage device. Otherwise, the data storage device is normally unmounted so that if the peripheral device were to be removed (e.g., unplugged) no harm or damage to data stored therein would occur. These aspects of the invention can be utilized alone or in combination with one another. The invention is particularly well suited for peripheral devices that are media players which are "hot" unpluggable without detrimental consequences.

Embodiments of this aspect of the invention are discussed below with reference to FIGS. 1-5B. However, those skilled in the art will readily appreciate that the detailed description given herein with respect to these figures is for explanatory purposes as the invention extends beyond these limited embodiments.

Figure 1:
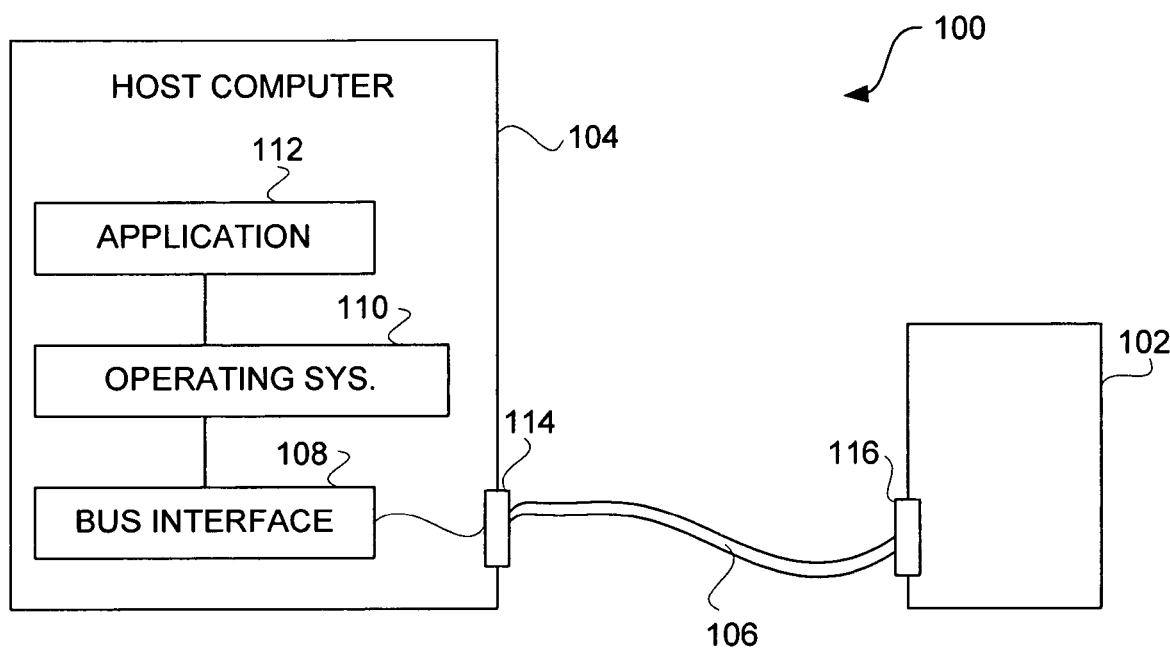
FIG. 1 is a block diagram of a remote media access system according to one embodiment of the invention.

FIG. 1 is a block diagram of a remote media access system 100 according to one embodiment of the invention. The remote media access system 100 includes a media player 102 and a personal computer (host computer) 104. The media player 102 is, for example, a portable, battery-operated device. In one embodiment, the media player 102 is a handheld media player 102 such as a MP3 player. The media player 102 is capable of being connected or attached to the host computer 104 through a data link 106. As shown in FIG. 1, the data link is represented by a cable. The host computer 104 includes a bus interface 108, an operating system 110 and an application 112. The application 112 typically performs processing on the host computer 104 that requires data to be read from or stored to the media player 102. The operating system 110 serves to provide a software layer between the application 112 and hardware interface components of the host computer 104. The operating system 110 can utilize the bus interface 108 that couples to the bus link 106 and therefore to the media player 102. When the bus link 106 is a cable, each end of the cable can have a connector that couples to a port or connector, such as a port or connector 114 of the host computer 104 and a port or connector 116 of the media player 102. In one example, the ports/connectors can be IEEE 1394 (FireWire®) ports/connectors and the peripheral cable 106 can be a FireWire® cable.

In one embodiment, the media player is a portable computing device dedicated to processing media such as audio, video or images. For example, the media player 102 can be a music player (e.g., MP3 player), a game player, a video player, a video recorder, a camera, an image viewer and the like. These devices are generally battery operated and highly portable so as to allow a user to listen to music, play games or video, record video or take pictures wherever the user travels. In one implementation, the media player is a handheld device that is sized for placement into a pocket or hand of the user. By being handheld, the media player is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the users hands, no reference surface such as a desktop is needed.

Figure 2:
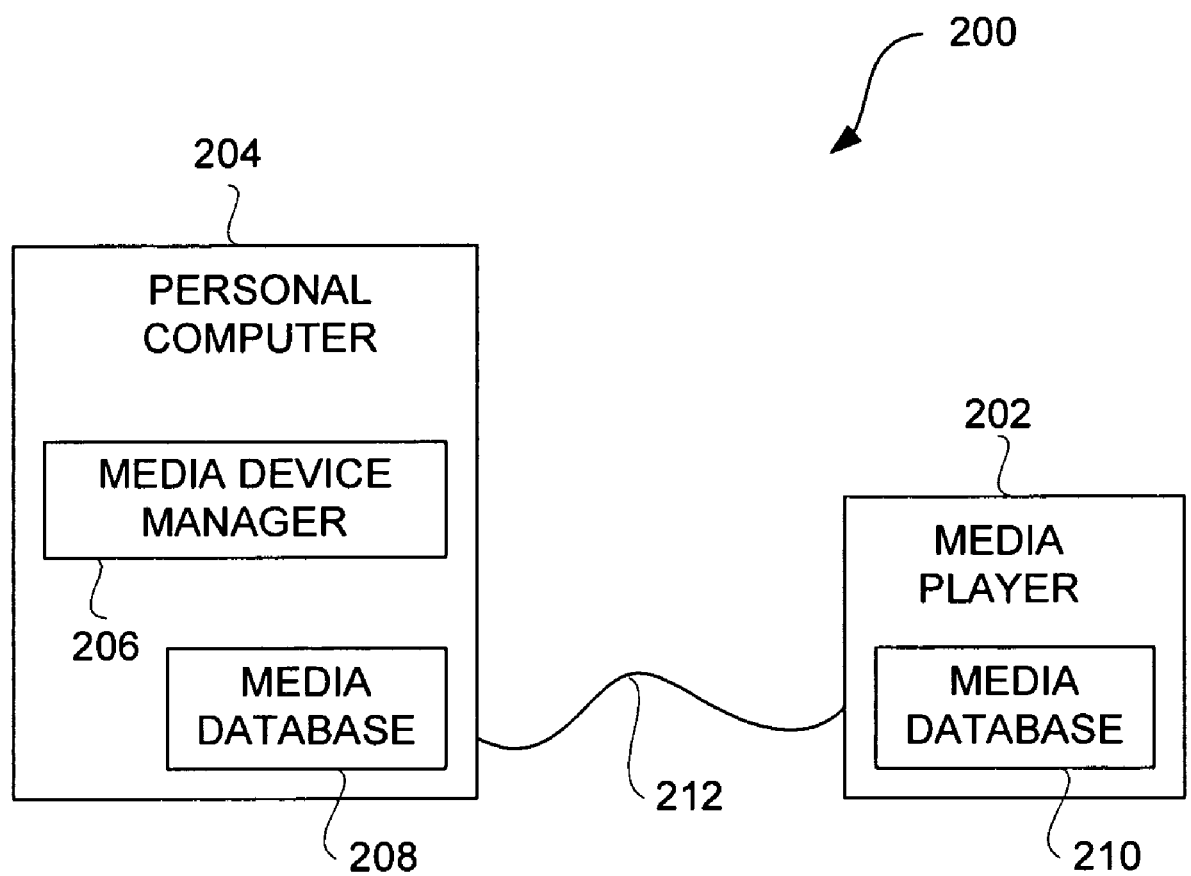
FIG. 2 is a block diagram of a remote media access system according to one embodiment of the invention.

FIG. 2 is a block diagram of a remote media access system 200 according to one embodiment of the invention. The media synchronization system 200 includes a media player 202 and a personal computer (host computer) 204. The personal computer 204 includes a media device manager 206. The personal computer 204 further includes a media database 208. The media player 202 includes a media database 210. Typically, according to one embodiment, the media player 202 will also include a data storage device (e.g., disk drive) for storing media content, a cache memory for storing media content in-use, a screen display for displaying information to a user, and a processor (e.g., microprocessor) for controlling operation of the media player 202. The screen display is often small. In other embodiments, the media player does not include a screen display.

A peripheral cable 212 provides a data path (or data link) between the media player 202 and the personal computer 204. The peripheral cable 212 provides a peripheral bus that couples the media player 202 to the personal computer 204. The peripheral bus, for example, could be a IEEE 1394 bus (i.e., FireWire® bus) or a Universal Serial Bus (USB). Alternatively, the peripheral cable 212 can be replaced by a wireless link.

The media device manager 206 can manage access to the media player 202 by the personal computer 204 over the peripheral cable 212. When the media device manager 206 detects that the media player 202 is physically coupled to the personal computer 204 via the peripheral cable 212, then the media device manager 206 can mount the data storage device as needed, but otherwise retain the data storage device unmounted. When mounted, the personal computer 204 can access the data storage device within the media player 202.

Although the need for access to the data storage device of the media player 202 can vary widely depending on application, one such application is a synchronization operation between the media content stored on the personal computer 204 and the media content stored on the media player 202. With such an application, the data storage device would be mounted and thus accessible during synchronization but then unmounted once synchronization has completed. Such synchronization can be achieved in a sophisticated manner through comparison of media information stored in the respective media databases 208 and 210. When comparison of the media information from the respective databases 208 and 210 indicates that there is a particular media item resident on the personal computer 204 but not on the media player 202, then the particular media item can be transmitted (downloaded) to the media player over the peripheral cable 212. On the other hand, when the comparison of the media information from the respective databases 208 and 210 indicates that a particular media item is resident on the media player 202 but not on the personal computer 204, then the particular media item can be either removed (deleted) from the media player 202 or transmitted (e.g., uploaded) over the peripheral cable 212 to the personal computer 204. Hence, by providing the media player 202 with the media database 210, more sophisticated synchronization and management of media content is enabled. The media database 210 also allows the media player 202 to present a user interface to the user that is more sophisticated than conventional approaches. Such a user interface can be presented on the screen display of the media player 202. The user interface can, for example, allow the user of the media player 202 to browse, sort, search, play, etc. the media content resident on the media player 202. The user interface can also allow the user of the media player 202 to download (add) or delete (remove) media items from the media player 202. The media manager 206 also has a user interface that allows a user to browse, sort, search, play, make playlists, burn Compact Discs (CDs), etc. the media content resident on the personal computer 204. The user interface can also allow the user of the personal computer 204 to download (add) or delete (remove) media items from the personal computer 204. In one embodiment, the media manager 206 and its associated user interface are provided by iTunes, version 2.0, from Apple Computer, Inc. of Cupertino, Calif.

Figure 3:
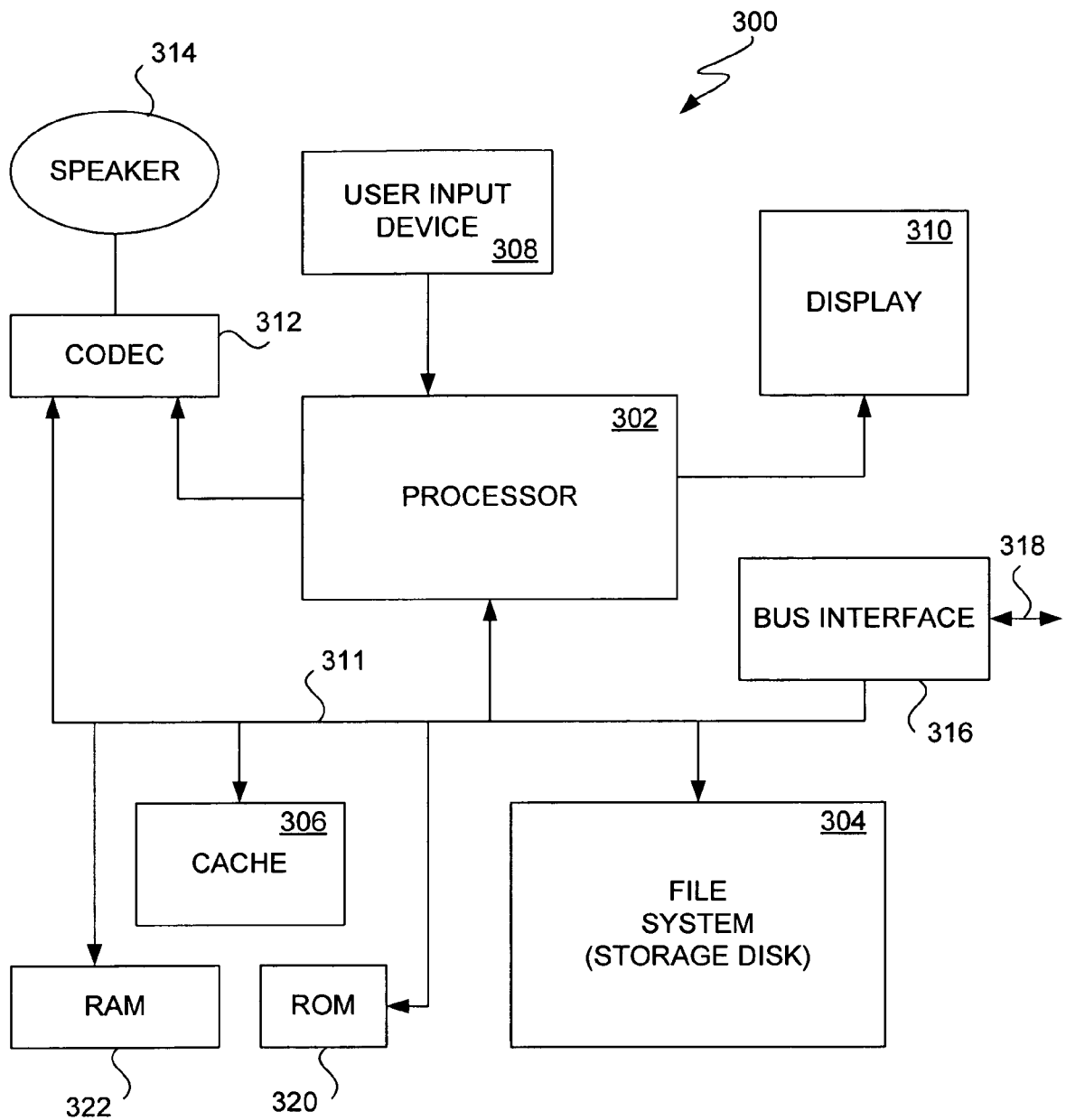
FIG. 3 is a block diagram of a media player according to one embodiment of the invention.

FIG. 3 is a block diagram of a media player 300 according to one embodiment of the invention. The media player 300 includes a processor 302 that pertains to a microprocessor or controller for controlling the overall operation of the media player 300. The media player 300 stores media data pertaining to media items in a file system 304 and a cache 306. The file system 304 is, typically, a storage disk or a plurality of disks. Alternatively, the file system 304 can be implemented by other types of non-volatile memory (e.g., FLASH memory). The file system 304 typically provides high capacity storage capability for the media player 300. However, since the access time to the file system 304 is relatively slow, the media player 300 can also include a cache 306. The cache 306 is, for example, Random-Access Memory (RAM) provided by semiconductor memory. The relative access time to the cache 306 is substantially shorter than for the file system 304. However, the cache 306 does not have the large storage capacity of the file system 304. Further, the file system 304, when active, consumes more power than does the cache 306. The power consumption is particularly important when the media player 300 is a portable media player that is powered by a battery (not shown). The media player 300 also includes a RAM 320 and a Read-Only Memory (ROM) 322. The ROM 322 can store programs, utilities or processes to be executed in a non-volatile manner. The RAM 320 provides volatile data storage, such as for the cache 306.

The media player 300 also includes a user input device 308 that allows a user of the media player 300 to interact with the media player 300. For example, the user input device 308 can take a variety of forms, such as a button, keypad, dial, etc. Still further, the media player 300 includes a display 310 (screen display) that can be controlled by the processor 302 to display information to the user. A data bus 311 can facilitate data transfer between at least the file system 304, the cache 306, the processor 302, and the CODEC 312.

In one embodiment, the media player 300 serves to store a plurality of media items (e.g., songs) in the file system 304. When a user desires to have the media player play a particular media item, a list of available media items is displayed on the display 310. Then, using the user input device 308, a user can select one of the available media items. The processor 302, upon receiving a selection of a particular media item, supplies the media data (e.g., audio file) for the particular media item to a coder/decoder (CODEC) 312. The CODEC 312 then produces analog output signals for a speaker 314. The speaker 314 can be a speaker internal to the media player 300 or external to the media player 300. For example, headphones or earphones that connect to the media player 300 would be considered an external speaker.

The media player 300 also includes a bus interface 316 that couples to a data link 318. The data link 318 allows the media player 300 to couple to a host computer.

Figure 4:
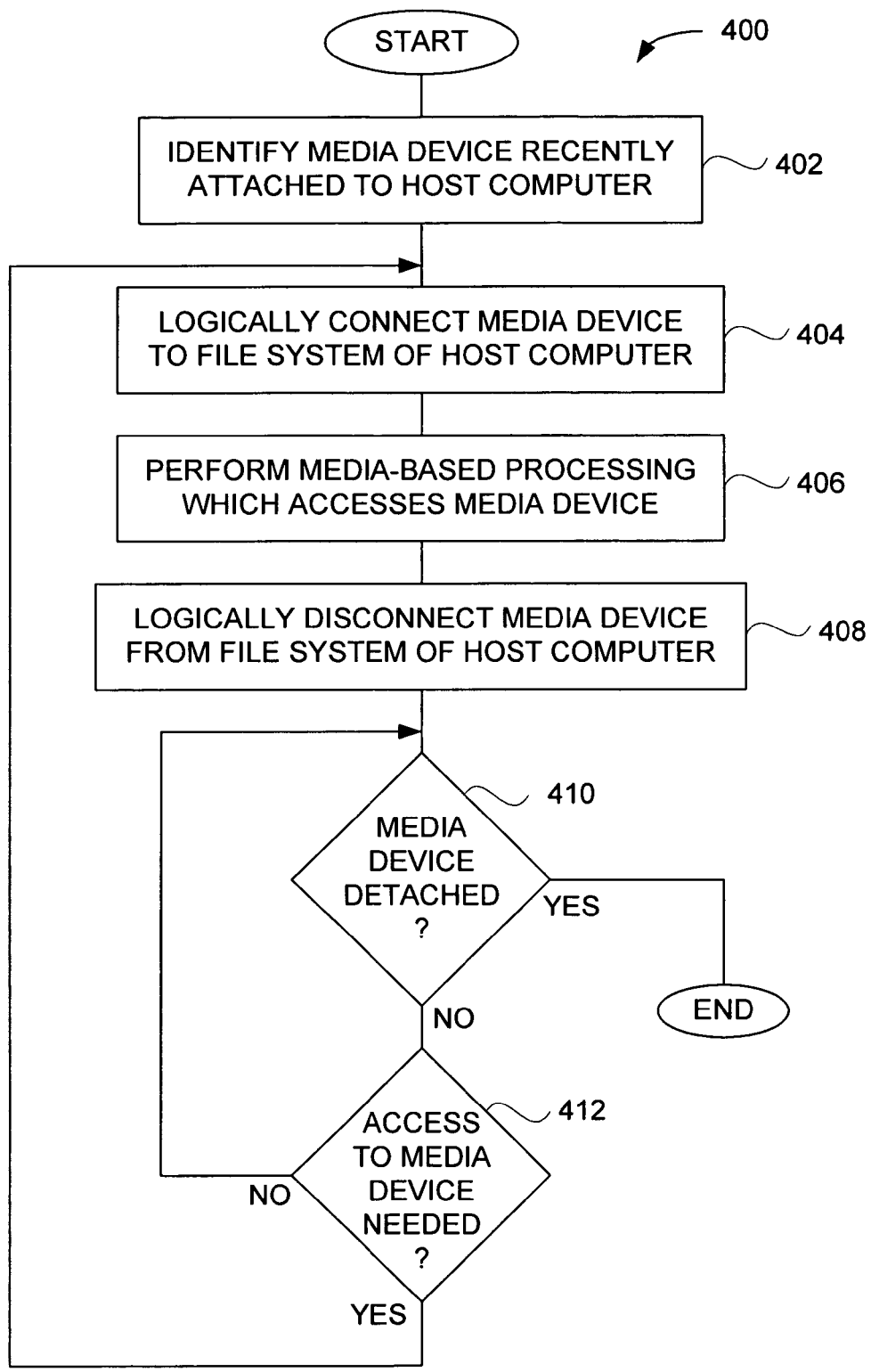
FIG. 4 is a flow diagram of media access processing according to one embodiment of the invention.

FIG. 4 is a flow diagram of media access processing 400 according to one embodiment of the invention. The media access processing 400 is, for example, performed by the media device manager 206 of the personal computer (host computer) 204 illustrated in FIG. 2 or the bus interfaces 108 of the host computer 104 illustrated in FIG. 1.

The media access processing 400 can be invoked when it is discovered that a media device has recently been attached to the host computer. Once invoked, the media access processing 400 identifies 402 the media device recently attached to the host computer.

The media device is then logically connected 404 to the file system of the host computer. Hence, the attaching of the media device to the host computer pertains to a physical connection or coupling of the media device to the host computer. Typically, such attachment is made via a data link. The data link is typically a cable having a connector at one or both ends, but can also be a wireless data link. The logical connection of the media device to the file system operates to configure the host computer to be able to access the media device. In particular, the media device typically includes a storage device, such as a data storage disk. In one embodiment, the logical connection involves mounting of the storage device of the media device to the file system of the host computer.

Media-based processing is then performed 406 to access the media device (i.e., the storage device of the media device). After the media-based processing has been performed 406, the media device is logically disconnected 408 from the file system of the host computer. In one embodiment, this involves an "unmounting" of the storage device of the media device from the file system of the host computer. At this point, although logically disconnected, the media device remains attached (e.g., physically connected) to the host computer.

Next, a decision 410 determines whether the media device has been detached from the host computer. When the decision 410 determines that the media device has been detached, then the media device processing 400 is complete and ends as the media device has been physically detached from the host computer and thus no longer communicates with or is accessible by the host computer. On the other hand, when the decision 410 determines that the media device has not been detached from the host computer, then a decision 412 determines whether access to the media device is needed. As an example, access to the media device would be needed if subsequent processing is about to be invoked (or desirous of being invoked), which would need to access the media device. For example, applications normally receive or obtain instructions pertaining to such subsequent processing. Hence, when the decision 412 determines that access to the media device is not needed, then the media access processing 400 returns to repeat the decision 410 and subsequent operations. In this case, the media device is able to be detached whenever desired. In other words, the media device is "hot" unpluggable at this point. Alternatively, when the decision 412 determines that access to the media device is now (or soon to be) needed, then the media access processing 400 returns to repeat the operation 404 and subsequent operations so that the media device can be again logically connected to the file system to support access thereto by the host computer, and then subsequently, logically disconnecting the media device from the file system.

Figure 5A:
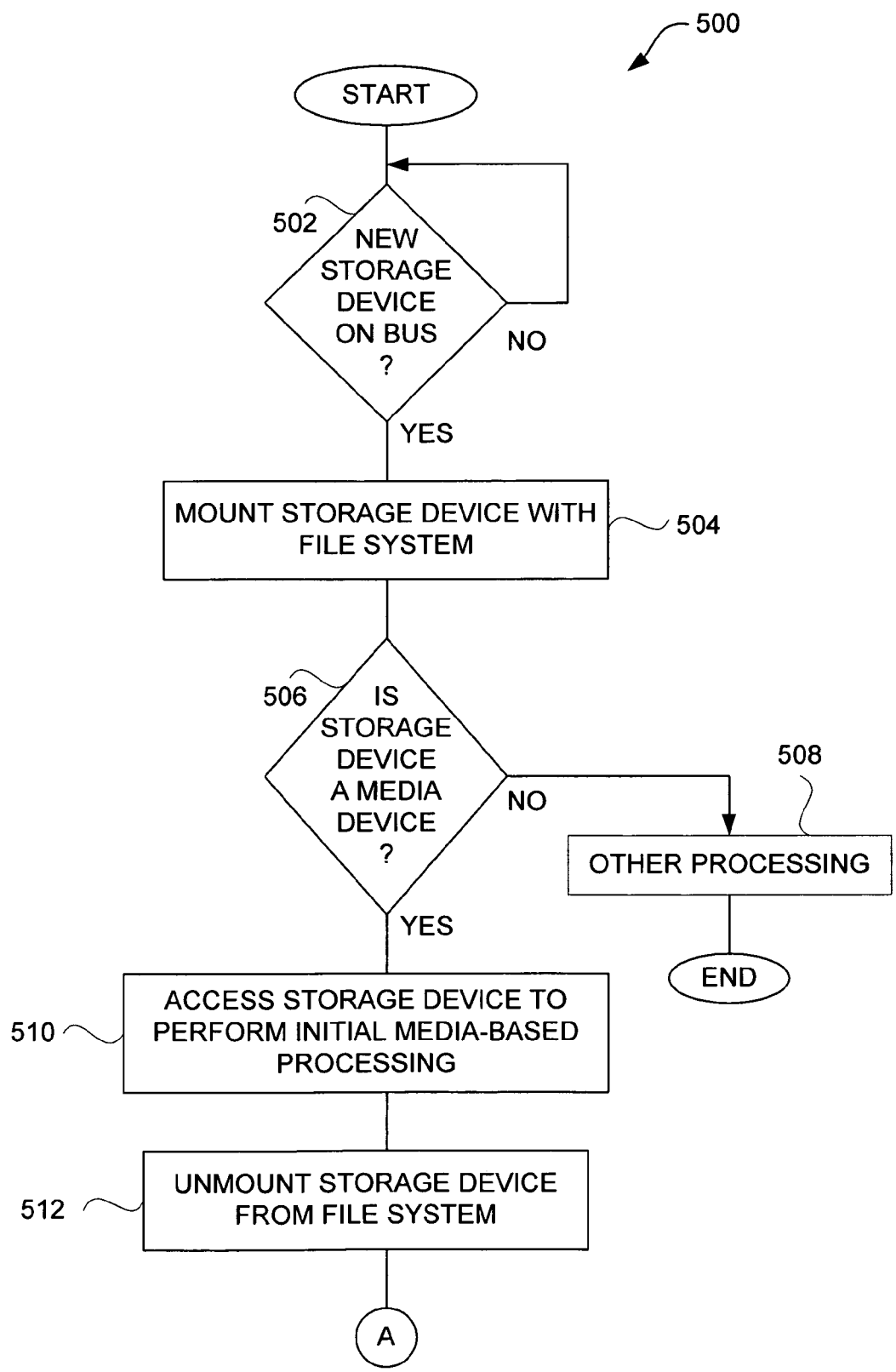
FIGS. 5A and 5B are flow diagrams of media access processing according to another embodiment of the invention.
Figure 5B:
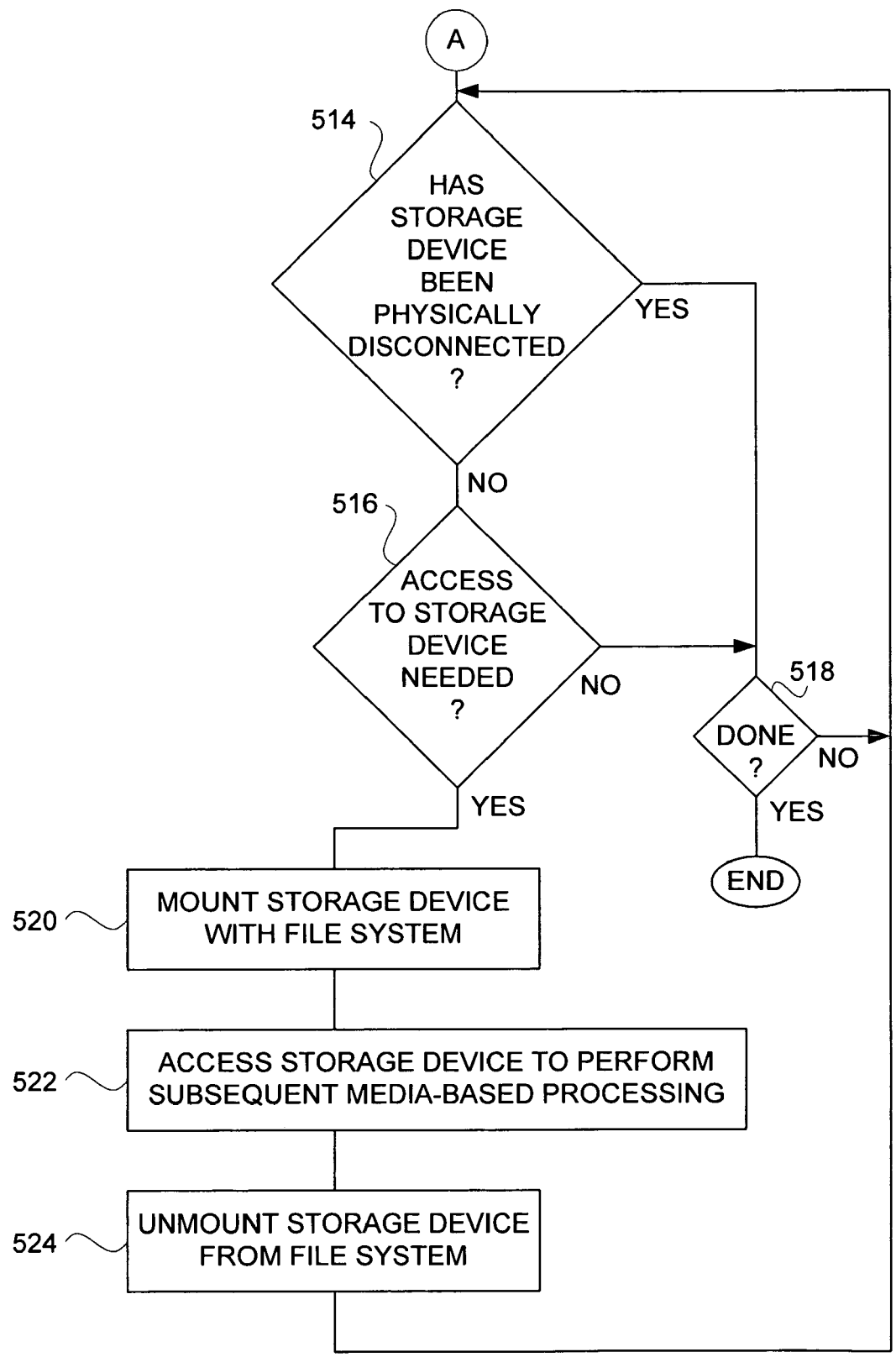

FIGS. 5A and 5B are flow diagrams of media access processing 500 according to another embodiment of the invention. The media access processing 500 is, for example, performed by the media device manager 206 of the personal computer (host computer 204) illustrated in FIG. 2.

The media access processing 500 begins with a decision 502 that determines whether a new storage device is present on a bus. Typically, the bus is a peripheral bus associated with the host computer. When the decision 502 determines that a new storage device is not now present on the bus, then the decision 502 causes the media access processing 500 to wait for the existence of a new storage device on the bus. Once the decision 502 determines that there is a new storage device present on the bus, then the storage device is mounted 504 with the file system of the host computer.

Next, a decision 506 determines whether the storage device is a media device. When the decision 506 determines that the storage device is not a media device, then other processing 508 can be performed. Such other processing 508 is unrelated to the access processing for gaining access to media content stored on a media device and thus is not further discussed herein. On the other hand, when the decision 506 determines that the storage device is a media device, then the storage device is accessed 510 to perform initial media-based processing. The initial media-based processing can serve a wide variety of functions or uses for either the media device or the host computer. In one embodiment, the initial media-based processing pertains to synchronization of the media content between the host computer and the media player. For additional details on synchronization processing, see U.S. patent application Ser. No. 10/118,069, filed Apr. 5, 2002, and entitled "INTELLIGENT SYNCHRONIZATION OF MEDIA PLAYER WITH HOST COMPUTER," which is hereby incorporated herein by reference. Specifically, in this application being incorporated, operations 610-624 of FIGS. 6A and 6B are particularly descriptive of appropriate synchronization operations that can be performed according to one embodiment. After the initial media-based processing has been performed and thus the access to the storage device completed, the storage device is unmounted 512 from the file system. At this point, the storage remains physically attached to the host computer but is eligible to be detached as the user desires. Consequently, the media access processing 500 automatically renders the storage device removable without any need for user interaction prior to its physical removal.

Next, a decision 514 determines whether the storage device has been physically disconnected from the host computer. When the decision 514 determines that the storage device has not been physically disconnected, a decision 516 determines whether access to the storage device is needed. When either the decision 514 determines that the storage device has been physically disconnected or when the decision 516 determines that access to the storage device is not needed, then a decision 518 determines whether the media access processing 500 is done or completed. When the decision 518 determines that the media access processing 500 is done, then the media access processing 500 ends. Alternatively, when the decision 518 determines that the media access processing 500 is not done, then the media access processing 500 returns to repeat the decision 514 and subsequent operations.

On the other hand, when the decision 516 determines that access to the storage device is needed, then the storage device is mounted 520 with the file system of the host computer. Here, since the storage device was previously mounted 504 and then unmounted 512, the mounting 520 can also be referred to as remounting. After the storage device has been mounted 520, the storage device is accessed 522 to perform subsequent media-based processing. The subsequent media-based processing pertains to processing performed by the host computer with respect to the storage device (media device) such that processing beyond the initial media-based processing is able to be carried out. Following the completion of the subsequent media-based processing, the storage device is unmounted 524 from the file system. At this point, the storage device remains physically attached to the host computer but is eligible to be detached as the user desires. Hence, the media access processing 500 again automatically renders the storage device removable without any need for user interaction prior to its physical removal. Following the operation 524, the media access processing 500 returns to repeat the decision 514 and subsequent operations.

Accordingly, by unmounting the storage device from the file system after the pending media media-based processing which utilizes the storage device completes, the storage device (media device) remains in an unmounted condition, for the most part. Stated differently, the default position for the storage device connected to the host computer is in an unmounted condition. When unmounted, the storage device (media device) permits the detachment (or disconnection) of the storage device (media device) from the host computer by the user without any preparatory user interactions. In other words, since the storage device is unmountable, the storage device (media device) can simply be unplugged from the host computer and none of the host computer, the media device or their data will be harmed or damaged by such user action.

In one embodiment, the storage device (media device) is considered as a removable media device or virtual removable drive. The storage device thus emulates the removability of a floppy, CD-ROM drive or memory card. In this embodiment, the host computer can initiate a "disk inserted" message to trick itself into thinking that a new removable media (e.g., disk) has just been inserted. As a result, the media device can be recognized and the media can be mounted even though the media device was never physically detached from the host computer after being previously recognized and mounted. The remount occurs without user interaction with either the host computer or the media player.

Optionally, instead of using the default condition as being unmounted, the data storage device within the media player can remain normally mounted. For example, the data storage device of the media player can remain mounted until a specific request to unmount. This optional approach can be utilized in a "hard drive" mode where the data storage device of the media player operates as a mass storage device (i.e., hard drive) for the host computer.

The invention can be implemented in software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that peripheral devices, e.g., media devices, are able to be "hot" unpluggable without data loss or corruption. Another advantage of the invention is that peripheral devices can have "plug-and-play" as well as "remove-and-go" characteristics which better satisfies user needs and usage.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer readable storage medium including at least computer program code for accessing a portable electronic device by a host computer over a data link, the portable electronic device having at least storage capability for storing media data, said computer readable medium comprising:
   computer program code for logically connecting the storage capability of the portable electronic device to a file system of the host computer immediately after the portable electronic device has been physically attached to the host computer via the data link, wherein there is no polling between the portable electronic device and the host computer in order to establish the logical connection;
   computer program code for performing first processing at the host computer which accesses the portable electronic device provided the portable electronic device is attached to the host computer via the data link; and
   computer program code for unmounting the storage capability of the portable electronic device from the file system without physically detaching the portable electronic device from the host computer via the data link, the logical disconnection being performed automatically after completing performance of the first processing which accesses the portable electronic device.

2. A computer readable storage medium as recited in claim 1, wherein the portable electronic device produces audio output for a user of the portable electronic device based on the media data stored in the storage device.

3. A computer readable storage medium as recited in claim 1, wherein the portable electronic device includes a data storage device, and
   wherein the unmounting is automatically performed by said computer program code for logical disconnection following access to the data storage device as needed for the first processing.

4. A computer readable storage medium as recited in claim 1, wherein following said logical disconnection of the portable electronic device, the portable electronic device is capable of being detached from the host computer via the data link without any preparatory user interactions with either the host computer or the portable electronic device.

5. A computer readable storage medium as recited in claim 1, wherein said computer readable medium further comprises:
   computer program code for subsequently determining whether subsequent processing at the host computer requires access to the portable electronic device that is logically disconnected therefrom but remains physically attached to the host computer via the data link.

6. A computer readable storage medium as recited in claim 5, wherein, when said computer program code for determining determines that the subsequent processing at the host computer requires access to the portable electronic device, said computer readable medium further comprises:
   computer program code for re-establishing the logical connection between the portable electronic device and the file system of the host computer, wherein there is no polling between the portable electronic device and the host computer in order to establish the logical connection;
   computer program code for performing, following said logical connection, the subsequent processing at the host computer which accesses the portable electronic device; and
   computer program code for unmounting the storage capability of the portable electronic device from the file system without detaching the portable electronic device from the host computer via the data link, said unmounting being automatically performed after completing access to the portable electronic device as needed for the subsequent processing.

7. A computer readable storage medium as recited in claim 6, wherein the portable electronic device include a data storage device, and
   wherein the logical disconnection is automatically performed by said computer program code for logical disconnection following access to the data storage device as needed for the first processing.

8. A computer readable storage medium as recited in claim 7, wherein the storage device is a disk storage device, and wherein when the portable electronic device is coupled to the host computer via the data link, the portable electronic device operates as a remote disk storage device for the host computer.

9. A computer readable storage medium as recited in claim 1, wherein the portable electronic device is a handheld device.

10. A computer readable storage medium as recited in claim 8, wherein the handheld device is a media player.

11. A computer readable storage medium as recited in claim 1, wherein at least a portion of the data link is provided over a peripheral cable.

12. A computer readable storage medium as recited in claim 1, wherein at least a portion of the data link is provided through a connector.

13. A computer readable storage medium as recited in claim 1, wherein the first processing is a synchronization process for media data whereby the host computer transfers certain media data to the portable electronic device.

14. A computer capable of accessing a portable electronic device, the portable electronic device having at least a bus for data transfer and a storage device for storing media content, said computer comprising:
   means for mounting the storage device of the portable electronic device with a file system of said computer immediately after it has been determined that the data transfer bus has been physically attached to the computer, wherein there is no polling between the portable electronic device and the computer in order for the storage device of the portable electronic device to be mounted with the file system;
   means for accessing the storage device over the bus to perform initial processing; and
   means for unmounting the storage device of the portable electronic device from the system of the computer once the initial processing is completed.

15. A computer as recited in claim 14, wherein the portable electronic device also includes processing circuitry and is associated with at least one of a display and a speaker, and the portable electronic device being capable of itself outputting the media content stored in the storage device to at least one of the display and the speaker.

16. A computer as recited in claim 14, wherein said computer program code for unmounting operates to unmount the storage device from the system automatically without any user initiated action to request unmounting.

17. A computer as recited in claim 14, wherein said computer further comprises:
   means for determining, subsequent to being unmounted, whether access to the storage device is needed to perform subsequent processing;
   means for remounting the storage device of the portable electronic device with the system of the other computer when it is determined that access to the storage device is needed;
   means for accessing the storage device from the other computer over the bus to perform the subsequent processing; and
   means for unmounting the storage device of the portable electronic device from the system of the other computer once said accessing for the subsequent processing is completed.

18. A computer as recited in claim 17, wherein the initial processing is initial media-based processing, and wherein the subsequent processing is subsequent media-based processing.

19. A computer as recited in claim 18, wherein the portable computing device produces audio output for a user of the portable electronic device from the media content stored in the storage device.

20. A computer as recited in claim 14, wherein said computer further comprises:
   means for detecting physical disconnection of the portable electronic device from the bus associated with the computer.

21. A computer capable of accessing a handheld electronic device, the handheld electronic device having at least a bus for data transfer and a data storage device for storing data, said computer comprising:
   a file system for storage of data; and
   a processor configured to (i) mount the data storage device of the handheld electronic device to said file system of said computer immediately after the data transfer bus has been physically attached to the computer without any polling between the handheld electronic device and the computer, (ii) access the data storage device over the bus to perform initial processing; and (iii) unmount the data storage device of the handheld electronic device from said file system of the computer once the initial processing is completed.

22. A computer as recited in claim 21, wherein the handheld electronic device produces audio output for a user of the handheld electronic device based on the data stored in the data storage device.

23. A computer as recited in claim 21, wherein the unmounting is automatically performed by said computer following access to the data storage device once the initial processing is completed.

24. A computer as recited in claim 21, wherein following said unmounting, the handheld electronic device is capable of being detached from the computer via the bus without any preparatory user interactions with either the computer or the handheld electronic device.

* * * * *